March 21, 1961 B. D. LOUGHLIN 2,976,409

DETECTOR CIRCUIT

Filed Oct. 19, 1956 2 Sheets-Sheet 1

2,976,409

DETECTOR CIRCUIT

Bernard D. Loughlin, Huntington, N.Y., assignor to Hazeltine Research, Inc., Chicago, Ill., a corporation of Illinois Filed Oct. 19, 1956, Ser. No. 617,040

10 Claims. (Cl. 250—20)

*General*

Figure 1:
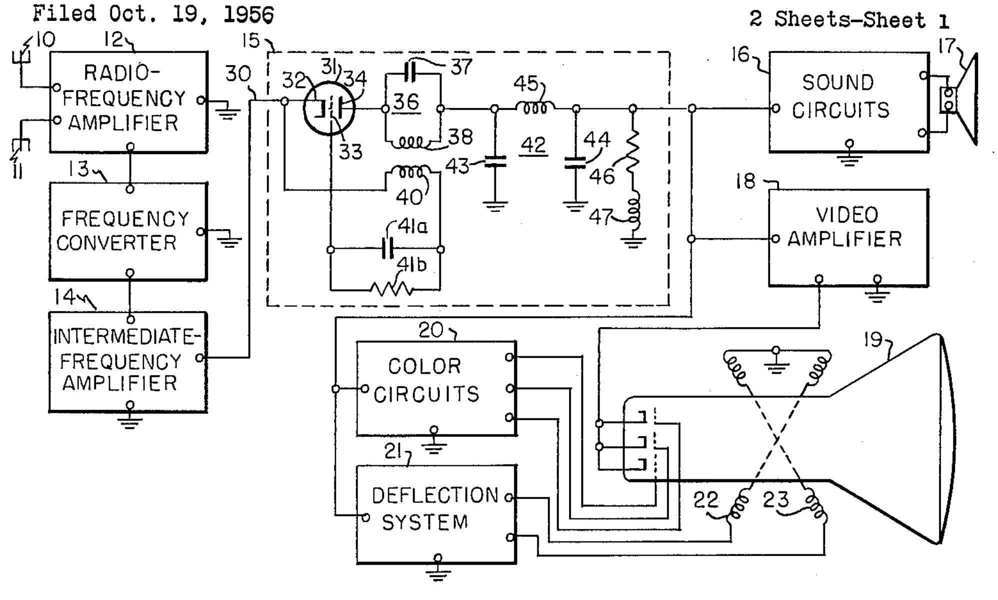

This invention relates to detector circuits for use as the second detectors in vestigial-side-band signal receivers and, in particular, to detector apparatus of the type which minimizes the distortions caused by envelope detection of the single-side-band portion of a vestigial-side-band carrier signal.

A common type of vestigial-side-band communication system is a television system of the type currently being used in the United States. In such a television system, the low-frequency modulation components are transmitted in a double-side-band manner while the higher frequency modulation components are transmitted in a single-side-band manner, this arrangement being a convenient way of conserving radio spectrum band width. Such type of signal transmission, however, gives rise to certain distortions when a conventional envelope detector is used as the second detector in the receiver for recovering the modulation components. In particular, the signal components transmitted in a single-side-band manner produce undesirable quadrature components which, in a negative modulation type of television transmission as used in the United States, cause suppression of the reproduced luminance information.

This undesired luminance suppression occurs in both monochrome- and color-television receivers and is particularly undesirable when a color signal is being received by a receiver of either of these types. This arises from the fact that, for transmission of a monochrome signal, the single-side-band components are usually of relatively small magnitude and, hence, cause a minimum of luminance-signal suppression in the receiver. In the case of a color transmission, however, additional signal components, namely the color subcarrier and its associated side bands, are deliberately frequently interleaved into the single-side-band region of the monochrome signal and these additional components may be relatively large in magnitude. A particularly bothersome component is a 920-kilocycle beat-note component arising from the interaction of the color subcarrier and the sound carrier, which beat-note component is too often inconveniently large in magnitude.

One solution to this problem which has been heretofore proposed is to minimize such quadrature distortion effects by utilizing a synchronous detection process for detecting the received composite television signal. The theory is that synchronous detection will, if properly utilized, detect only the in-phase component of the received signal and will, more or less, totally ignore the quadrature components. The apparatus heretofore proposed for carrying out such synchronous detection, however, have been of types which are more complex and costly than is generally desirable.

It is an object of the invention, therefore, to provide a new and improved detector circuit for use as the second detector in a vestigial-side-band signal receiver.

It is another object of the invention to provide a synchronous type detector circuit for use as the second detector in a vestigial-side-band signal receiver which is of relatively simple and inexpensive construction.

In accordance with the invention, a detector circuit for use as the second detector in a vestigial-side-band amplitude-modulated signal receiver comprises circuit means for applying a vestigial-side-band amplitude-modulated carrier signal which is to be detected and means including an electric valve nonconductive in the absence of the carrier component of the applied signal and having input and output electrodes and coupled to the circuit means for rectifying the applied signal. This circuit also includes narrow band frequency-selective regenerative feedback circuit means oscillatory in response to the applied signal at a harmonic of the carrier frequency and at a phase determined by the carrier signal component and which is coupled from an output electrode to an input electrode of the electric valve and is responsive to successive cycles of the applied signal to successively enable substantial translation through the valve only during selected phase intervals of the carrier component of the applied signal. The circuit further includes circuit means coupled to an output electrode of the electric valve for further translating the video-frequency modulation components of the rectified signal.

For a better understanding of the present invention, together with other and further objects thereof, reference is had to the following description taken in connection with the accompanying drawings, and its scope will be pointed out in the appended claims.

Figure 2A:
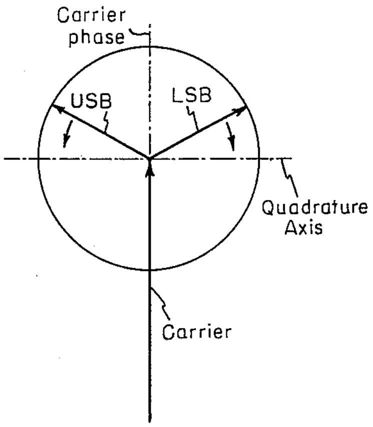
Figure 2B:
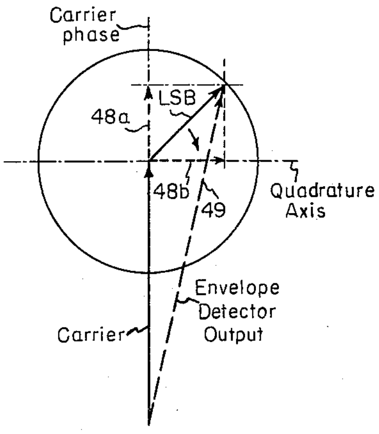
Figure 3:
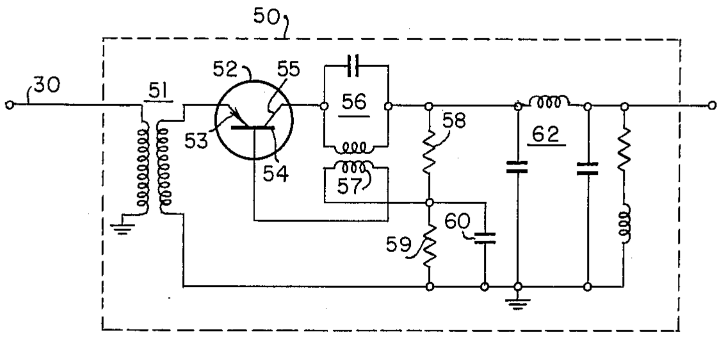
Figure 4:
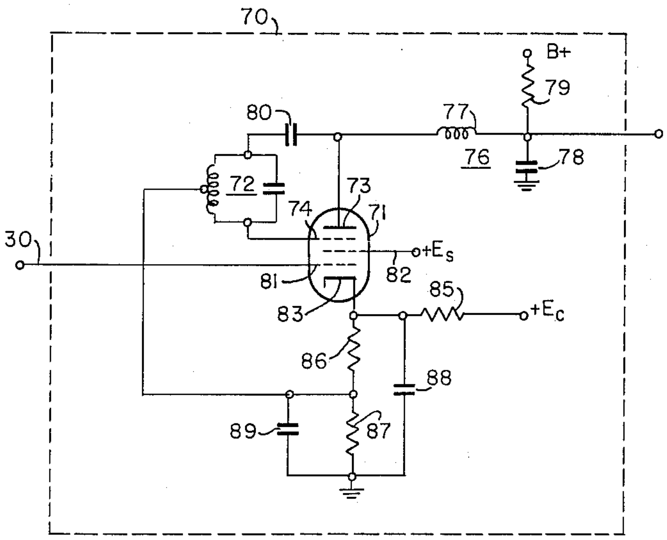

Referring to the drawings:

Fig. 1 is a circuit diagram, partly schematic, of a representative embodiment of a color-television receiver including a detector circuit constructed in accordance with the present invention;

Figs. 2*a* and 2*b* are vector diagrams used in explaining the operation of the invention;

Fig. 3 is a circuit diagram of a further form of detector circuit constructed in accordance with the present invention, and Fig. 4 is a circuit diagram of an additional embodiment of a detector circuit constructed in accordance with the present invention.

*Television receiver of Fig. 1*

Referring now to Fig. 1 of the drawings, there is shown a representative embodiment of a color-television receiver which serves to indicate the form of a typical vestigial-side-band signal receiver wherein a detector circuit, in accordance with the present invention, might be utilized. In particular, the receiver of Fig. 1 includes an antenna system 10, 11 for intercepting the transmitted color-television signal which, in turn, is supplied to a radio-frequency amplifier 12 wherein it is amplified a desired amount. Such amplified radio-frequency signal is then supplied to a frequency converter 13 wherein it is heterodyned with a local oscillator signal to produce the usual intermediate-frequency signal which corresponds to the original received signal except that the frequency range has been changed to an intermediate-frequency value. This intermediate-frequency signal is, in turn, supplied to an intermediate-frequency amplifier 14 which serves to provide additional signal amplification.

Coupled to the output circuit of the intermediate-frequency amplifier is a detector circuit 15 included within the dashed line box and constructed in accordance with the present invention which is effective, as will be discussed more in detail hereinafter, to detect the modulation components of the intermediate-frequency carrier signal. Thus there results at the output of the detector circuit 15 a composite video-frequency signal including sound, monochrome, color, and deflection synchronizing components. The sound component is selected by the usual sound circuits 16 and then supplied to a loudspeaker 17. The monochrome-signal component, which carries the information regarding the monochrome composition of the image being televised, is supplied by way of a video amplifier 18 to a color-image-reproducing device as illustrated by the three-gun shadow-mask color reproducer 19 of Fig. 1. The color-signal components of the composite signal are selected and processed by the usual color circuits 20 to develop, for example, red, green, and blue color-difference signals which are then supplied to the control electrodes of the picture tube 19. The deflection synchronizing components are selected and processed by the deflection system 21 and, in this manner, serve to control the production of line-scan and field-scan deflection currents which are supplied to the corresponding deflection yoke coils 22 and 23.

As indicated in Fig. 1, the detector circuit of the present invention is useful in a color-television receiver. It is equally as useful in a monochrome-television receiver and, in this regard, the receiver of Fig. 1 would represent such a monochrome receiver if the color circuits 20 were omitted and the picture tube 19 were replaced by a one-gun monochrome picture tube. The invention, of course, is not limited to television receivers but may be utilized in other types of signal receivers wherein it is necessary to detect a transmitted signal, a portion of which is transmitted in a single-side-band manner.

*Description of detector circuit of Fig. 1*

Considering in more detail the detector circuit 15 of Fig. 1, such circuit constitutes a representative embodiment of a detector circuit, constructed in accordance with the present invention, for use as the second detector in a vestigial-side-band signal receiver. Such detector circuit includes circuit means for applying a vestigial-side-band amplitude-modulated carrier signal which is to be detected. This circuit means may include the initial portion of the television receiver, that is, the antenna system 10, 11, the radio-frequency amplifier 12, the frequency converter 13, and the intermediate-frequency amplifier 14, as well as the conductor 30 for supplying the intermediate-frequency amplitude-modulated carrier signal to the detector circuit 15.

In addition, the detector circuit includes an electron-discharge device such as, for eample, a tube 31 for rectifying the applied signal. Such electron-discharge device may include an input electrode, a control electrode, and an output electrode, with the input electrode being connected to the input or supply circuit means represented by, for example, the conductor 30. In the case of the tube shown in the Fig. 1 embodiment of the invention, the input electrode may be the cathode 32, the control electrode may be the control electrode 33, and the output electrode may be the anode 34.

The detector circuit of the present invention also includes a frequency-selective regenerative feedback circuit means which is tuned to a harmonic of the carrier frequency and is coupled to a control electrode of the electron-discharge device and is responsive to successive cycles of the applied signal to successively enable substantial translation through the electron-discharge device only during selected phase intervals of the carrier component of the applied signal. Such regenerative feedback circuit means may include, for example, a tuned circuit 36 coupled to the output electrode 34 and responsive to the double-side-band portion of the modulated carrier signal for deriving a signal having a phase representative of the carrier phase. Such tuned or oscillatory circuit 36 may include a condenser 37 and a coil or winding 38 connected in parallel to form a parallel-resonant oscillatory circuit. The tuned circuit 36 should be a sharply tuned high-Q circuit so that the phase of the control signal derived by such circuit in not affected by the single-side-band portion of the applied signal.

The regenerative feedback circuit means may also include circuit means for applying the signal derived by, for example, the tuned circuit 36 to the control electrode 33 for controlling conduction through the electron-discharge device 31 to enable substantial signal translation through the device 31 only during selected phase intervals of the carrier component. This circuit means may include, for example, a transformer winding 40 which is inductively coupled to the coil 38 of the tuned circuit 36. Winding 40 is, in turn, coupled between the control electrode 33 and cathode 32 of the tube 31. The polarity of winding 40, relative to the coil or winding 38, should be such that the feedback is regenerative in nature. In other words, the tuned circuit 36 and the associated connections of the winding 40 are coupled to the electron-discharge device in order to form therewith an oscillator circuit which is constructed so that successive cycles of the applied signal cause the oscillator circuit to be successively energized, thereby to oscillate under the direct and complete control of the applied signal.

There may be included in the regenerative feed-back circuit additional means for self-biasing the electron-discharge device for rendering the conduction control effect on the tube 31 primarily independent of the magnitude of the modulated carrier signal supplied by the input circuit means represented, for example, by conductor 30. Such self-biasing means may include, for example, a condenser 41*a* and grid-leak resistor 41*b*.

The detector circuit may also include a low-pass filter 42 coupled to the output electrode 34 of the electron-discharge device 31 for further translating the video-frequency modulation components of the rectified signal. The low-pass filter circuit 42, as shown in Fig. 1, may be of standard construction and may include by-pass condensers 43 and 44 and a choke coil 45. In addition, there may be coupled across the output of the low-pass filter 42 a load resistor 46 and a peaking coil 47.

*Operation of detector circuit of Fig. 1*

Considering now the operation of the detector circuit 15 just described, the intermediate-frequency amplifier 14 is effective to supply by way of conductor 30 to the cathode 32 of tube 31 a vestigial-side-band amplitude-modulated intermediate-frequency carrier signal having modulation components corresponding to the modulation components of the originally received signal. Assuming for the moment that the tuned circuit 36 and the control electrode 33 of tube 31 were not present in the circuit, then the tube 31 would function as a diode detector to rectify the intermediate-frequency signal. The low-pass filter 42 would then be effective to pass only the modulation components of the rectified signal. This type of assumed operation represents the operation of a more or less conventional second detector circuit commonly found in television receivers.

Conventional envelope detection of a vestigial-side-band signal, however, gives rise to undesired signal distortions due to the fact that a portion of the signal, namely the higher frequency modulation components, is transmitted in a single-side-band manner. This may be seen by reference to Figs. 2*a* and 2*b* wherein Fig. 2*a* is a vector diagram representing the case where a modulation component is transmitted in a double-side-band manner. In accordance with well-known modulation theory, the modulation component of a modulated carrier may be represented by a pair of side-band components which, in turn, may be represented vectorially as shown in Fig. 2*a*. The upper side-band (USB) component corresponds to a component of frequency which is equal to the sum of the carrier and modulating video frequencies, while the lower side-band (LSB) component represents a signal component of frequency equal to the difference between the carrier and video-modulation frequencies. Accordingly, the upper side-band component is continually advancing in phase relative to the carrier and, hence, may be represented as a vector rotating in a counterclockwise manner relative to the vector representing the carrier. Similarly, the lower side-band component, being of lower frequency, is continually falling back in phase relative to the carrier and, hence, may be represented by a vector rotating in a clockwise sense. For double-side-band transmission, both upper and lower side-band components are transmitted and, hence, the net amplitude variations, corresponding to the vector sum of the side-band components, occur along the carrier-phase axis as indicated in Fig. 2*a*. In other words, the quadrature- or 90°-phase axis components of the upper and lower side bands are always equal in magnitude and opposite in polarity.

For the case of a higher frequency video-modulation component, such component is transmitted in a single-side-band manner, which type of transmission may be represented vectorially by the vector diagram of Fig. 2*b*. In this case, one of the side-band components has been suppressed at the transmitter and, hence, as indicated by the vector diagram of Fig. 2*b*, only a single vector (LSB) is used to represent such signal.

Now an envelope detector, that is, for example, a simple diode detector, responds to the peak amplitude of the modulated carrier signal supplied thereto and, hence, is effective to derive the modulation envelope of the received carrier signal. For the case of double-side-band transmission, such detected envelope contains only signal components which are in phase with the carrier phase. For the case of single-side-band transmission, however, both carrier-phase and quadrature-phase components of the single-side-band signal are present in the detected envelope. This is represented diagrammatically by the dashed line vectors **48*a* and 48*b*** of Fig. 2*b* and occurs because there is no longer a mating side band to produce an opposite polarity quadrature component to effectively cancel the quadrature component **48*b*. The resultant detected envelope is indicated by the dashed line vector 49**. The undesired quadrature component effectively increases the apparent carrier level and, because a higher carrier level represents an increase in picture information in a black direction in a negative modulation system, there is thereby caused a suppression of the luminance-signal component of the reproduced image. This is undesirable in that it produces a spurious component in the reproduced image. Also, in the case of a color receiver, some color- or chrominance-signal suppression occurs.

One possible way of eliminating the quadrature distortions is to use a synchronous type detector in place of the ordinary diode type envelope detector. This is because a synchronous detector, when supplied with a proper synchronizing signal, looks only at the in-phase signal components and, hence, ignores the quadrature components. The present invention describes a novel and relatively inexpensive synchronous type detector circuit for obtaining this result. Considering that the tuned circuit 36 is a narrow band width resonant circuit that is sharply tuned to, for example, the first harmonic of the carrier frequency, that is, to the carrier frequency itself, then it is effective to develop an oscillatory type signal having a phase representative of the carrier phase. This oscillatory signal is then supplied by way of the transformer winding 40 to the control electrode 33 to momentarily gate the tube 31 to a condition of substantial conductivity only during the peaks of such oscillatory signal. In this manner, a synchronous detection action is achieved. In other words, assuming that the intermediate-frequency value of the picture carrier frequency is 45 megacycles, then the tube 31 is being gated on for short intervals at a 45-megacycle rate so as to look at only the in-phase carrier components. In this manner, the quadrature-phase components are substantially ignored and the resulting video signal at the output of the low-pass filter 42 is primarily composed of only the in-phase signal components. It will be noted that the tuned circuit 36, the transformer winding 40, and the associated coupling to the control electrode 33 effectively form a regenerative feedback path for selected frequency components of the received signal. In other words, these circuit elements are coupled to the tube 31 to form therewith an oscillator circuit. In this regard, the invention might be described as an "oscillating detector."

In order to obtain synchronous detection of the in-phase component of the carrier signal, it is necessary that the phase of the oscillatory or control signal which is supplied back to the control electrode 33 be accurately representative of the phase of the carrier component of the applied signal. This may be achieved as illustrated by the detector circuit 15 of Fig. 1 by having the oscillator circuit completely under the control of the applied signal. To this end, it will be noted that no direct-current operating potentials are supplied to the detector circuit 15. Hence, such circuit cannot "oscillate" in the absence of an input signal. When the circuit does oscillate in the presence of an input signal, then the oscillations are in phase with the phase of the applied carrier component because the tuned circuit 36 is a high-Q circuit which is tuned to the carrier frequency. In other words, the regenerative feedback energy is primarily supplied by the double-side-band portion of the applied carrier signal, which portion is a constant phase portion of phase corresponding to the carrier phase. Thus, successive cycles of the double-side-band portion successively excite the oscillator circuit so that the oscillating or gating signal is accurately in phase with the applied carrier signal. Also, the flywheel or inertia effect of the tuned circuit 36 prevents the oscillator circuit from responding to rapid spurious fluctuations in the rectified output signal.

The condenser **41*a* and grid-leak resistor 41*b* form a self-biasing network to render the oscillatory signal effect on conduction through tube 31 primarily independent of the magnitude of the applied signal. In other words, the bias developed across the condenser 41*a* and resistor 41*b* is a variable type bias which varies in accordance with the amplitude of the applied signal so that the effect of the oscillatory control signal developed by the tuned circuit 36 on conduction within the tube 31 is substantially constant and independent of the magnitude of the applied signal. In this manner, a linear relationship is provided between the signal amplitude at the output of the low-pass filter 42 and the signal amplitude at the cathode 32 of tube 31**. In the absence of such grid-limiting action, the input-output signal relationship would tend to be square law in nature.

It was assumed that the tuned circuit 36 was tuned to the first harmonic of the carrier component, that is, to the carrier frequency itself. However, this need not be the case as higher harmonics of the carrier frequency may, instead, be utilized. That is, the tuned circuit 36 may be tuned to higher harmonics of the carrier frequency, in which case the gating intervals for the tube 31 may be shorter in duration due to the shorter oscillatory period of such higher harmonics. In this regard, it is to be clearly understood that the term "harmonic" as used in both the specification and claims is intended to include the fundamental or first harmonic as well as the higher harmonics of the intermediate-frequency picture carrier.

*Detector circuit embodiment of Fig. 3*

Referring now to Fig. 3 of the drawings, there is shown a further embodiment 50 of a detector circuit constructed in accordance with the present invention and which may be used in place of circuit 15 of Fig. 1 for obtaining synchronous type detection of the amplitude-modulated carrier signal. This embodiment differs primarily from that of the embodiment of Fig. 1 in that a transistor type circuit is utilized. More specifically, the circuit 50 includes input circuit means, as represented by the input transformer 51, and an electron-discharge device, as represented by the transistor 52, for rectifying the modulated carrier signal. For the transistor case, the input electrode of the electron-discharge device may be, for example, an emitter electrode 53, the control electrode may be a base electrode 54, and the output electrode may be a collector electrode 55.

The circuit also includes a high-Q tuned circuit 56 corresponding to the tuned circuit 36 of Fig. 1 and a transformer winding 57 coupled to the base electrode 54 and constituting the regenerative feedback path for controlling conduction through the transistor 52. Grid-limiting action, that is, a variable emitter-to-base bias is developed by way of the network including resistors 58 and 59 and condenser 60. The detector circuit 50 also includes a low-pass filter 62 corresponding to the low-pass filter 42 of Fig. 1 for further translating the video-frequency modulation components of the rectified signal.

The detector circuit 50 operates in a manner analogous to the circuit of Fig. 1. More particularly, the amplitude-modulated carrier signal is supplied by way of transformer 51 to the transistor 52. Some of this signal gets through to the tuned circuit 56 and the double-side-band portion thereof excites this circuit which is tuned to a harmonic of the carrier frequency to supply a control signal back to the base electrode 54 of the transistor 52 so that such transistor 52 affords substantial conduction only during the selected phase intervals of the carrier component. The phase of the control signal which is fed back to the base 54 is again accurately controlled by the applied signal in that this is the only source of operating energy for the oscilaltory circuit formed by the transistor 52, the tuned circuit 56, the transformer winding 57, and associated connections.

*Detector circuit embodiment of Fig. 4*

Referring now to Fig. 4 of the drawings, there is shown another embodiment 70 of a detector circuit constructed in accordance with the present invention and which may be used in the television receiver of Fig. 1 in place of the detector circuit 15 there shown. In the case of the Fig. 4 circuit, the electron-discharge device is, for example, a pentode type vacuum tube 71 and a tuned circuit 72 is coupled between the anode 73 and suppressor electrode 74 thereof to form therewith an oscillator circuit which oscillates under the control of the applied signal to obtain the desired synchronous detection of the applied signal. In this case, the low-pass filter is represented by a filter 76 including a choke coil 77 and a by-pass condenser 78 for further translating the video-frequency modulation components of the rectified signal appearing at the anode 73. Resistor 79 is a load resistor and serves as a path for connecting the anode 73 to a source of operating potential B+. The condenser 80 is a direct-current blocking condenser.

As shown in Fig. 4, the applied signal from the intermediate-frequency amplifier is to be applied to a control electrode 81 of the tube 71 while a constant operating potential $+E_s$ may be supplied to the screen electrode 82. The cathode 83 is coupled to, for example, ground by way of a biasing network which includes a source of potential $+E_c$, resistors 85, 86, and 87, and a radio-frequency by-pass condenser 88. By suitably selecting the values of resistor 85 and the total of resistors 86 and 87, a proper bias level may be established such that the tube 71 is biased approximately at cutoff. Resistor 87, operating in conjunction with a further by-pass condenser 89, serves to establish a bias level for the suppressor electrode 74 which may be suitably adjusted by selecting the value of resistor 87.

In operation, the intermediate-frequency amplitude-modulated carrier signal is applied to the control electrode 81. Because the tube is biased at cutoff, the tube 71 serves to rectify the applied signal and the filter 76 coupled to the anode 73 is effective to pass only the video-frequency modulation components of the rectified signal. As before, the tuned circuit 72 and associated connections are effective to form an oscillator circuit which is controlled by the applied signal to produce synchronous detection of such signal. In this case, accurate control is maintained over the phase of the oscillatory signal supplied to the suppressor electrode 74 because of the fact that the tube is biased at or below cutoff, and, hence, will not oscillate in the absence of an applied signal and because of the further fact that when it does oscillate in the presence of an applied signal, the phase of such oscillation is determined by the high-Q tuned circuit 72 which is sharply tuned to a harmonic of the carrier frequency. As a result, each cycle of the double-side-band portion of the applied signal is effective to control the energizing of the tuned circuit 72 and thereby control the phase of the oscillatory signal supplied to the suppressor electrode 74.

It is of interest to note that, as a result of the presence of an oscillatory type signal at the suppressor 74, the cathode current of the tube 71 is continually being diverted back and forth between the screen electrode 82 and the anode 73. As a result, the signal present at the screen electrode 82 contains primarily the quadrature components of the single-side-band portion whereas the signal at the anode 73 contains primarily the in-phase components. Because the quadrature components may be developed at the screen electrode 82, these components may be properly processed and subsequently added to the in-phase signal to cancel any residual quadrature components that might still remain therein. In other words, the quadrature signal at the screen electrode 82 might, if desired, be suitably inverted in phase and attenuated so as to produce a canceling type signal for canceling any residual quadrature distortion remaining in the detected signal after the indicated synchronous detection thereof.

It has been tacitly assumed up to this point that the tuned circuit 72 is tuned to the first harmonic, that is, the fundamental of the carrier frequency. While such first harmonic operation would be satisfactory, a unique and somewhat more advantageous form of operation is obtained if the tuned circuit 72 is, instead, tuned to the second harmonic of the carrier frequency. In this case, the biasing afforded by the resistors 85, 86, and 87 and the source of bias potential $+E_c$ should again be adjusted so that the tube 71 is biased at or below cutoff. In this way, the cathode-current flow of the tube 71 will correspond to a rectified replica of the input carrier signal. Also, the bias of the suppressor grid 74 should be adjusted, for example, by selecting the proper value for the resistor 86 so that the second harmonic signal developed across the tuned circuit 72 is effectively clipped or limited during the peaks of the positive and negative variations thereof. In other words, the bias of the suppressor grid 74 should be selected so that such grid is overdriven in both the positive and negative directions so that the resulting conduction control effects varies in a square-wave manner. There will result square-wave switching of the cathode-current flow back and forth between the anode 73 and the screen electrode 82 at a second harmonic rate.

As a result of such square-wave switching signal current will tend to flow to the anode for short periods which will occur twice for each cycle of the input carrier signal. Every other one of these conduction intervals, however, will occur during a negative swing of the carrier signal at which time the biasing of the cathode 83 will prevent any flow of cathode current. The over-all effect is that signal current will flow to the anode only once during each cycle of the carrier signal and, due to the phasing of the second harmonic signal, such period of current flow will occur during the positive peaks of the carrier signal. As a result, synchronous detection of primarily the in-phase carrier components is obtained and detected video-modulation components corresponding primarily to such in-phase components are obtained at the anode 73.

One advantage of the overdriven operation of the suppressor electrode 74 is that the effect of the second harmonic signal on the anode-current flow will be substantially independent of the amplitude of the input carrier signal. The use of the second harmonic switching rate enables shorter conduction intervals to be obtained and, hence, provides correct synchronous detection action even for the case where variations in the timing of the signals would otherwise cause distortion due to clipping off of negative portions of the carrier-signal cycles. In fact, the carrier phase can deviate up to ±45° without introducing any appreciable error.

*Conclusion*

An additional advantage that results from using a synchronous type second detector circuit constructed in accordance with the present invention in a television receiver is that it also affords a means of more readily and more accurately tuning the receiver so that the picture carrier falls at the proper point on the sloping portion of the receiver characteristic, provided that the receiver also includes a separate detector circuit for providing the usual automatic-gain-control operation of the carrier-signal amplifiers. Such a result arises from the fact that the presence of the synchronous type second detector having a tuned circuit which is sharply tuned at a frequency corresponding to the desired operating point on the receiver characteristic causes a noticeable maximum to occur in the picture brightness as the picture carrier is tuned through this desired operating point. Thus, the fine tuning control of the receiver need only be adjusted until maximum picture brightness is obtained.

From the foregoing descriptions of the various embodiments of the invention, it will be apparent that a synchronous type detector circuit constructed in accordance with the present invention represents a circuit of relatively simple and inexpensive construction which may be utilized as the second detector in a vestigial-side-band signal receiver to obtain a detected signal which contains a minimum of quadrature distortion components.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A detector circuit for use as the second detector in a vestigial-side-band amplitude-modulated signal receiver, the circuit comprising: circuit means for applying a vestigial-side-band amplitude-modulated carrier signal which is to be detected; means including an electric valve nonconductive in the absence of the carrier component of the applied signal and having input and output electrodes and coupled to the circuit means for rectifying the applied signal; narrow band frequency-selective regenerative feedback circuit means oscillatory in response to said applied signal at a harmonic of the carrier frequency and at a phase determined by the carrier signal component and which is coupled from an output electrode to an input electrode of the electric valve and is responsive to successive cycles of the applied signal to successively enable substantial translation through said valve only during selected phase intervals of the carrier component of the applied signal; and circuit means coupled to an output electrode of the electric valve for further translating the video-frequency modulation components of the rectified signal.

2. A detector circuit for use as the second detector in a vestigial-side-band amplitude-modulated signal receiver, the circuit comprising; circuit means including an intermediate-frequency amplifier for applying a vestigial-side-band amplitude-modulated intermediate-frequency carrier signal which is to be detected; means including an electric valve nonconductive in the absence of the carrier component of the applied signal and having input and output electrodes and coupled to the circuit means for rectifying the applied intermediate-frequency signal; narrow band frequency-selective regenerative feedback circuit means oscillatory in response to said applied signal at a harmonic of the carrier frequency and at a phase determined by the carrier signal component and which is coupled from an output electrode to an input electrode of the electric valve and is responsive to successive cycles of the applied signal to successively enable substantial translation through said valve only during selected phase intervals of the carrier component of the applied signal; and circuit means coupled to an output electrode of the electric valve for further translating the video-frequency modulation components of the rectified signal.

3. A detector circuit for use as the second detector in a vestigial-side-band amplitude-modulated signal receiver, the circuit comprising: circuit means for applying a vestigial-side-band amplitude-modulated carrier signal which is to be detected; means including an electric valve nonconductive in the absence of the carrier component of the applied signal and having input and output electrodes and coupled to the circuit means for rectifying the applied signal; a narrow band oscillatory circuit which is tuned to oscillate at a harmonic of the carrier frequency and is coupled to an output electrode and an input electrode of the electric valve to form therewith an oscillator circuit, such oscillator circuit being constructed so that successive cycles of the applied signal cause the oscillator circuit to be successively energized thereby to oscillate with both frequency and phase under the direct and complete control of the applied signal to enable substantial translation through the electric valve only during selected phase intervals of the carrier component of the applied signal; and circuit means coupled to an output electrode of the electric valve for further translating the video-frequency modulation components of the rectified signal.

4. A detector circuit for use as the second detector in a vestigial-side-band amplitude-modulated signal receiver, the circuit comprising: circuit means for applying a vestigial-side-band amplitude-modulated carrier signal which is to be detected; means including an electric valve nonconductive in the absence of the carrier component of the applied signal and having input and output electrodes and coupled to the circuit means for rectifying the applied signal; circuit means for biasing the electric valve to a nonconductive condition in the absence of an applied signal, such bias being of a value such that the electric valve is rendered conductive during a portion of each of the successive cycles of the applied signal; frequency-selective regenerative feedback circuit means oscillatory in response to said applied signal at a harmonic of the carrier frequency and at a phase determined by the carrier signal component and which is coupled between an output electrode and an input electrode of the electric valve and is responsive to the successively translated portions of the applied signal to successively reinforce translation through said electric valve only during selected phase intervals of the carrier component of the applied signal; and circuit means coupled to an output electrode of the electric valve for further translating the video-frequency modulation components of the rectified signal.

5. A detector circuit for use as the second detector in a vestigial-side-band amplitude-modulated signal receiver, the circuit comprising: input circuit means for supplying a vestigial-sde-band amplitude-modulated carrier signal which is to be detected; means including an electric valve nonconductive in the absence of the carrier component of the applied signal for rectifying the modulated carrier signal, the valve including an input electrode, a control electrode, and an output electrode, the input electrode being connected to the input circuit means; a tuned circuit coupled from the output electrode to the input electrode and responsive to the double-side-band portion of the carrier signal for deriving a signal having a phase representative of the carrier phase; circuit means for applying the derived signal to the control electrode for controlling conduction through the electric valve to enable substantial signal translation through the valve only during selected phase intervals of the carrier component; and circuit means coupled to the output electrode of the electric valve for further translating the video-frequency modulation components of the rectified signal.

6. A detector circuit for use as the second detector in a vestigial-side-band amplitude-modulated signal receiver, the circuit comprising: input circuit means for supplying a vestigial-side-band amplitude-modulated carrier signal which is to be detected; means including an electric valve nonconductive in the absence of the carrier component of the applied signal for rectifying the modulated carrier signal, the valve including an input electrode, a control electrode, and an output electrode, the input electrode being connected to the input circuit means, a high-Q tuned circuit which is sharply tuned to a harmonic of the carrier frequency and is coupled to the output electrode and responsive to the double-side-band portion of the carrier signal for deriving a signal having a phase representative of the carrier phase, the narrow band width of the tuned circuit enabling the phase of the derived signal to be substantially unaffected by the single-side-band portion of the supplied signal; circuit means for applying the derived signal to the control electrode for controlling conduction through the electric valve to enable substantial signal translation through the valve only during selected phase intervals of the carrier component; and circuit means coupled to the output electrode of the electric valve for further translating the video-frequency modulation components of the rectified signal.

7. A detector circuit for use as the second detector in a vestigial-side-band amplitude-modulated signal receiver, the circuit comprising: input circuit means for supplying a vestigial-side-band amplitude-modulated carrier signal which is to be detected; means including an electric valve nonconductive in the absence of the carrier component of the applied signal for rectifying the modulated carrier signal, the valve including an input electrode, a control electrode, and an output electrode, the input electrode being connected to the input circuit means; a tuned circuit coupled to the output electrode and responsive to the double-side-band portion of the carrier signal for deriving a signal having a phase representative of the carrier phase; circuit means for applying the derived signal to the control electrode for controlling conduction through the electric valve to enable substantial signal translation through the valve only during selected phase intervals of the carrier component; circuit means for biasing the electric valve to render the conduction control effect primarily independent of the magnitude of the modulated carrier signal supplied by the input circuit means; and circuit means coupled to the output electrode of the electric valve for further translating the video-frequency modulation components of the rectified signal.

8. A detector circuit for use as the second detector in a vestigial-side-band amplitude-modulated signal receiver, the circuit comprising: input circuit means for supplying a vestigial-side-band amplitude-modulated carrier signal which is to be detected; means including an electric valve nonconductive in the absence of the carrier component of the applied signal including a cathode, an input electrode, a screen electrode, a suppressor electrode, and an anode, the input electrode being connected to the input circuit means; circuit means for biasing the electric valve to render the valve conductive only during one polarity of half cycles of the supplied carrier signal thereby to rectify such signal; a tuned circuit coupled to the anode and responsive to the double-side-band portion of the rectified carrier signal for deriving, only during the occurrence of the supplied carrier signal, a signal having a phase representative of the carrier phase; circuit means for applying the derived signal to the suppressor electrode for controlling current flow to the anode to enable substantial signal translation to the anode only during selected phase intervals of the carrier component; and circuit means coupled to the anode of the electric valve for further translating the video-frequency modulation components of the rectified signal.

9. A detector circuit for use as the second detector in a vestigial-side-band amplitude-modulated signal receiver, the circuit comprising: input circuit means for supplying a vestigial-side-band amplitude-modulated carrier signal which is to be detected; means including an electric valve nonconductive in the absence of the carrier component of the applied signal including a cathode, an input electrode, a screen electrode, a suppressor electrode, and an anode, the input electrode being connected to the input circuit means; circuit means for biasing the electric valve to render the valve conductive only during one polarity of half cycles of the supplied carrier signal thereby to rectify such signal; a tuned circuit which is sharply tuned to the second harmonic of the carrier frequency and is coupled to the anode and responsive to the double-side-band portion of the rectified carrier signal for deriving, only during the occurrence of the supplied carrier signal, a second harmonic signal having a phase representative of the carrier phase; circuit means for applying the derived second harmonic signal to the suppressor electrode for controlling current flow to the anode to enable substantial signal translation to the anode only during selected phase intervals of the carrier component; circuit means for biasing the suppressor electrode to obtain approximately square-wave switching between the anode and the screen electrode of the cathode-current flow; and circuit means coupled to the anode of the electric valve for further translating the video-frequency modulation components of the rectified signal.

10. A detector circuit for use as the second detector in a vestigial-side-band amplitude-modulated signal receiver, the circuit comprising: circuit means for applying a vestigial-side-band amplitude-modulated carrier signal which is to be detected; means including an electric valve nonconductive in the absence of the carrier component of the applied signal and having input and output electrodes and coupled to the circuit means for rectifying the applied signal; narrow band frequency-selective regenerative feedback circuit means oscillatory in response to said applied signal at a harmonic of the carrier frequency and at a phase determined by the carrier signal component and which is coupled to an output electrode and an input electrode of the electric valve to form therewith an oscillator circuit responsive to successive cycles of the applied signal, being constructed so that the only energy supplied to this circuit is the energy contained in the applied signal, thereby to successively enable substantial translation through the electric valve only during selected phase intervals of the carrier component of the applied signal; and circuit means coupled to an output electrode of the electric valve for further translating the video-frequency modulation components of the rectified signal.

References Cited in the file of this patent

UNITED STATES PATENTS

| | | |
|---|---|---|
| 1,847,190 | Marrison | Mar. 1, 1932 |
| 2,050,963 | Conklin | Aug. 11, 1936 |
| 2,165,764 | Pitsch | July 11, 1939 |
| 2,171,678 | Weyers | Sept. 5, 1939 |
| 2,494,795 | Bradley | Jan. 17, 1950 |

FOREIGN PATENTS

| | | |
|---|---|---|
| 669,669 | Germany | Dec. 31, 1938 |

OTHER REFERENCES

Tucker: "The History of Homodyne and Synchrodyne"; Journal of the British Institution of Radio Engineers; April 1954; received May 17, 1954; pp. 143–154.